United States Patent [19]
Dati et al.

[11] Patent Number: 6,014,613
[45] Date of Patent: Jan. 11, 2000

[54] COMPENSATION METHOD WITH CONTROL SYSTEMS, NAMELY WITH HIGH DELAY, AND CORRESPONDING COMPENSATION CONTROL SYSTEM

[75] Inventors: Angelo Dati, Viareggio; Ivan Bietti, Casalromano, both of Italy

[73] Assignee: STMicroelectronics, S.r.l., Agrate Brianza, Italy

[21] Appl. No.: 09/135,963

[22] Filed: Aug. 18, 1998

[30] Foreign Application Priority Data

Aug. 18, 1997 [EP] European Pat. Off. .............. 97830425

[51] Int. Cl.[7] .................................................. G05B 11/42
[52] U.S. Cl. ........................ 702/190; 364/165; 364/166
[58] Field of Search ................................ 364/148–152, 364/160–165, 180, 166, 167; 702/108, 189, 190, 197; 318/609, 610

[56] References Cited

U.S. PATENT DOCUMENTS

| | | |
|---|---|---|
| 5,124,626 | 6/1992 | Thoen ........................................ 318/610 |
| 5,245,830 | 9/1993 | Aubrun et al. ................................. 62/6 |
| 5,742,503 | 4/1998 | Yu ............................................ 364/162 |

FOREIGN PATENT DOCUMENTS

0 553 356 A1  8/1993  European Pat. Off. .

*Primary Examiner*—Kamini Shah
*Attorney, Agent, or Firm*—Theodore E. Galanthay; Kevin S. Ross; Seed and Berry LLP

[57] ABSTRACT

A control signal compensation method is particularly intended for an analog/digital processing system provided with a control loop, including in turn a controller and a monitoring circuit. The method includes storing corrections made by the controller, fast processing such as corrections before transmitting the corrections throughout the control loop, and generating a compensation signal for the latency effects of the controller, by the use of a negative feedback loop provided at the monitoring circuit level. A compensation control system implements the above method, and an analog/digital processing system incorporates such a compensation control system

13 Claims, 5 Drawing Sheets

COMPENSATION METHOD WITH CONTROL SYSTEMS, NAMELY WITH HIGH DELAY, AND CORRESPONDING COMPENSATION CONTROL SYSTEM

TECHNICAL FIELD

This invention relates to a compensation method for control systems, namely with high latency.

The invention particularly, but not exclusively, concerns a control signals compensating method, and a compensation control system for an analog/digital processing system, and the description that follows is making reference to this field of application for convenience of explanation.

BACKGROUND OF THE INVENTION

As is well recognized, a problem posed by mixed sampled-data analog/digital systems is that of controlling the characteristics of the treated signal for optimization of its processing.

Errors in the width of the expected signal, as well as biasing and sampling errors, are usually estimated by means of specific monitoring circuits, which will modify the parameters of the whole processing system by specifically acting on their section dedicated to the analog pre-processing step.

Figure 1:
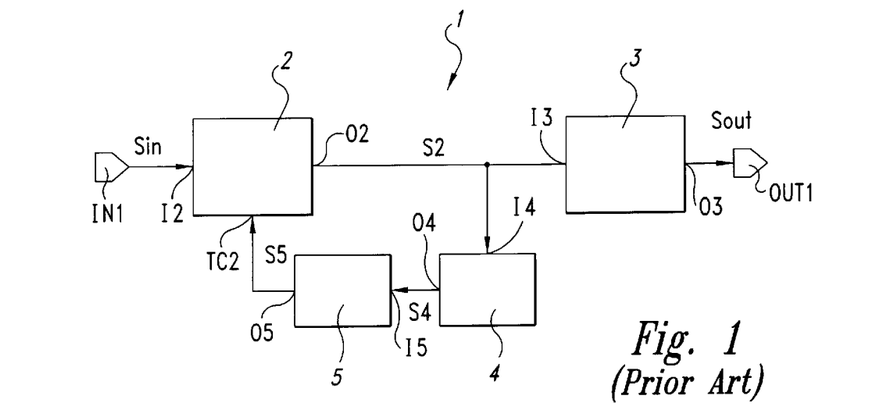
FIG. 1 shows schematically an analog/digital processing system according to the prior art.

A prior analog/digital processing system is shown schematically as 1 in FIG. 1. The analog/digital processing system has an input terminal IN1 receiving an input signal Sin to be treated, and an output terminal OUT1 delivering a treated output signal Sout.

The analog/digital processing system 1 includes an analog filter circuit 2 and a digital processing circuit 3, connected in series with each other between the input terminal IN1 and the output terminal OUT1.

In particular, the analog filter circuit 2 has an input terminal I2 connected to the input terminal IN1 of the analog/digital processing system, and an output terminal O1 connected to an input terminal I3 of the digital processing circuit 3, having in turn an output terminal O3 connected to the output terminal OUT1 of the analog/digital processing system 1.

The output terminal O2 of the analog filter circuit 2 is connected to a control terminal TC2 thereof, through a series of a monitoring circuit 4 and a controller 5.

More particularly, the output terminal O2 of the analog filter circuit 2 is connected to an input terminal I4 of the monitoring circuit 4, having in turn an output terminal O4 connected to an input terminal I5 of the controller 5. The controller 5 has an output terminal O5 connected to the control terminal TC2 of the analog filter circuit 2.

In general, the controller 5 is a Proportion-Integral-Derivative (PID) circuit, that is a circuit capable of producing a correcting signal S5 which is proportional to the combination of the first derivative and the integral of an error signal S4 produced by the monitoring circuit 4, and a term proportional to the error signal S4.

Since the characteristics of the signal Sin to be treated are usually known, this simple class of PID controllers is sufficiently versatile. It is indeed possible to employ different monitoring circuits for phase, offset, and gain signals from the analog/digital processing system 1, which monitoring circuits will not interact with one another, so that separate controllers can be obtained which are adapted to independently act on different parameters, specifically of the analog portion of the analog/digital processing system 1.

The monitoring circuit 4 is input a filtered signal S2, and outputs an error signal S4 which is a non-linear function of the input signal and proportional to the estimated characteristic of the treated signal Sout.

Integrating the monitoring circuit 4 and the controller 5 to the digital domain is a convenient choice. It should be noted, however, that, for systems which are operated at high frequencies, the processing of the signal Sin to be treated must be split over several clock cycles.

Thus, a latency is introduced in the control loop formed of the monitoring circuit 4 and the controller 5, which latency imposes constraints to the loop gain of the analog/digital processing system 1, thereby penalizing its overall performance.

Latency means here a predetermined delay in the transmission of data through the control loop, that is a delay between the application of a stimulus, or perturbation, to the control loop input and the first correction thereof being output from the control loop, which delay is usually expressed as clock cycles.

It could be considered to compensate for the degraded performance of the analog/digital processing system 1 by adopting a more sophisticated design for the controller 5. But in actual practice, this would reflect in the latency of the control loop being further increased.

The need to keep latency low, felt especially in applications where the clock cycle is a very short one, leads to compromising by the use of a low-versatility controller which is granted a sufficiently long time for the system to converge on optimum parameters; this implies that, during a processing step, data will be preceded by a preamble of sufficient length to allow the monitoring-controller loop to settle.

A first prior solution to the problem of reducing the control loop latency consists of using a controller 5 which includes a PLL or phase-locking loop 6.

Figure 2:
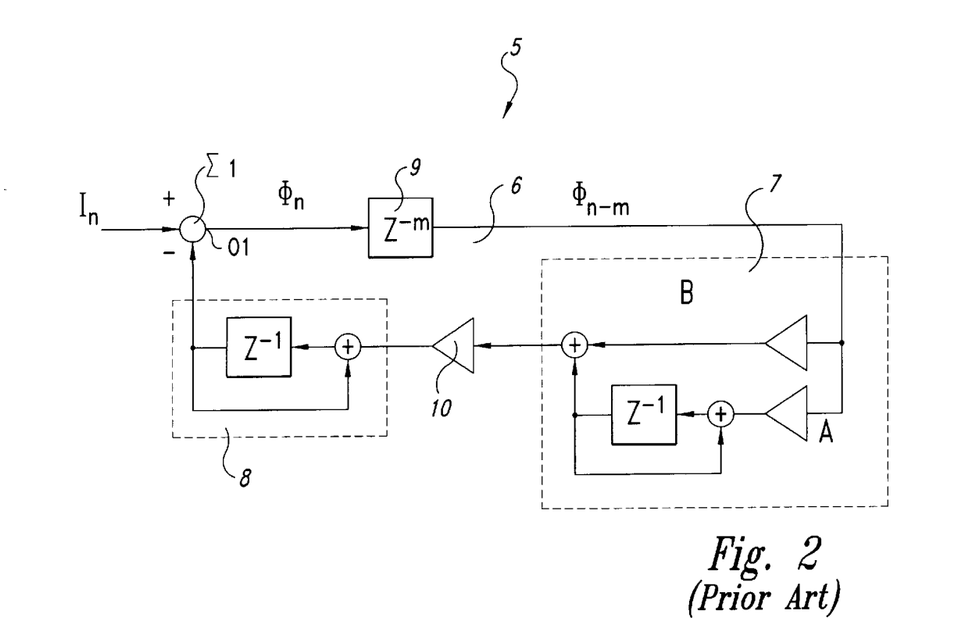
FIG. 2 shows schematically a controller for use in the analog/digital processing system of FIG. 1.

FIG. 2 shows schematically a linearized model of such a prior controller 5, including a phase-locking loop generally denoted by the numeral 6. Specific reference will be made, purely for illustrative purpose, to the instance of a sampling step controller 5, the considerations made herein below being of more general merit.

Specifically for processing that signal, the PLL controller 5 is to be applied to a phase detector, assumed for simplicity to be working in a linear mode, i.e., in a near-locking condition.

The PLL controller 5 has at its input an adder node $\Sigma 1$ which receives a first signal in on an adder terminal (+) and a second signal VCOn on a subtract terminal (−), and delivers a regulated phase signal $\Phi n$ on an output terminal O1. The PLL controller 5 includes a loop filter 7, formed of a simple controller PI, and a voltage/frequency converter 8, modeled as a simple integrator, which are connected in series with each other between the output terminal O1 and the subtract terminal of the adder $\Phi 1$.

The PLL controller 5 exhibits a latency M, schematically represented by a latency block 9, and a loop gain vco gain, schematically represented by a gain block 10.

The loop filter 7 has first A and second B characteristic parameters, being respectively an integral gain and a proportional gain, whose variations govern the stability of the analog/digital processing system 1 whereto the PLL controller 5 is applied. In particular, as the latency M increases, the range in which the system 1 remains stable against the varying characteristic parameters A and B becomes increasingly narrower, and the choice of these integral A and proportional B gains is greatly restrained in consequence.

When a PLL controller 5 of this type is used, it becomes impossible to optimize, for example, the control time of convergence during the preamble. It matters to observe that, not even by substituting, for the PI filter 7, some general-purpose filter of greater complexity characterized by a frequency response with two poles and two zeroes, can any substantial improvement be achieved in the system characteristic.

Figures 3, 4:
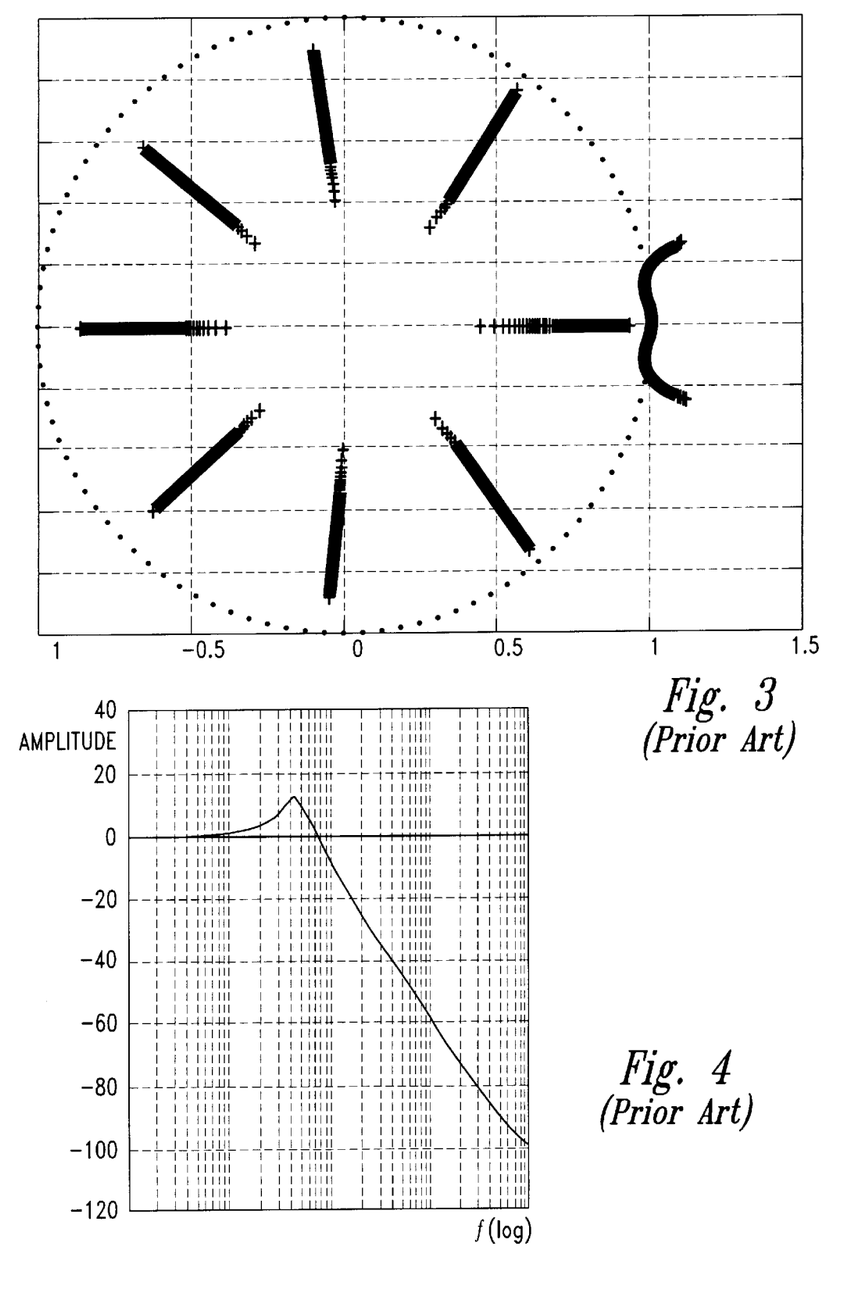
FIG. 3 shows the position of the roots of the controller in FIG. 2.
FIG. 4 shows the form of the amplitude response on log scale of the controller in FIG. 2.

The reason for such deep influence of the latency M on the performance of the controller 5 formed with a phase-locking loop 6 can be appreciated from an inspection of the position of the roots of the controller 5, as shown in FIG. 3.

This controller 5 has M poles at the origin due to the latency M, and has two poles at +1 and a zero at 1-A/B which are tied to the loop filter-voltage/frequency converter combination.

An analysis of the position of the roots in FIG. 3 shows that the poles which tend to exit the unity circle first are those of the position branches with origin at +1; also, such poles originate the slowest modes of the PLL controller 5, at any values of the loop gain vco gain of the phase-locking loop 6, due to they being bounded within the sector (defined by the polar coordinates (θ, r)):

$$(\theta, r) \in \left\{ -\frac{\pi}{M+1} < \vartheta < \frac{\pi}{M+1}, 1 - \frac{A}{B} < r < 1 \right\} \quad (1)$$

Since the ratio A/B is to approach unity for the PLL controller 5 to be stable, the available range is apparently limited. It should be noted, however, that in any case, where higher values of the latency M than 5 must be accepted for design reasons, a unity increase of the latency would not alter the characteristics of the PLL controller 5 to any significant extent.

FIG. 4 shows the form of the amplitude response of the PLL controller 5. In particular, the graph of FIG. 4 is plotted to a log scale, with the value 1 placed at a frequency f=½T, T being the clock period of the analog/digital processing system, and relates to a PLL controller 5 with latency M=8.

In accordance with the foregoing, this pattern remains virtually unchanged throughout its right-hand half as the characteristic parameters A and B of the loop filter 7 vary.

Figure 5:
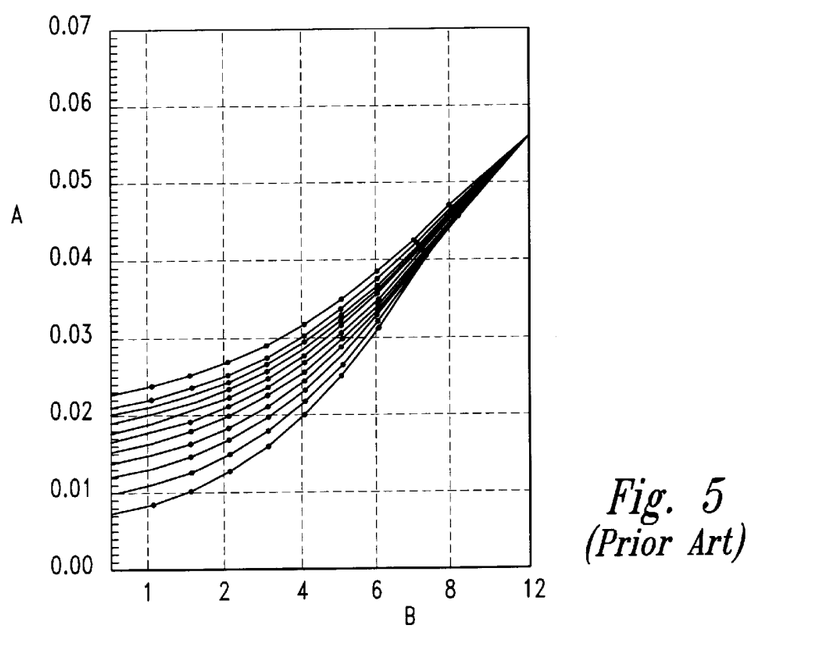
FIG. 5 illustrates the behavior of the −3 dB band limit of the controller in FIG. 2 against variations of a parameter thereof.

FIG. 5 shows patterns for a band limit at –3 dB of the PLL controller 5 against the parameter A, with the normalized values of the parameter B along the abscissa axis. In particular, the band limit is marked along the ordinate axis as a percent fraction of ½T.

From the graphs of FIGS. 4 and 5, it can be concluded that the only portion of the frequency response of the PLL controller 5 which is affected by variations of the characteristic parameters A and B of the loop filter 7 of the phase-locking loop 6 is the low-frequency portion, since the remainder of the response is dependent on the positions of the poles introduced by the latency M; the positions of these poles are essentially defined solely by the loop gain vco gain of the phase-locking loop 6.

It should be noted that the use of a loop filter with a more complicated architecture than that shown in FIG. 2 would not enhance the controller versatility to any satisfactory extent, nor would it enhance that of the analog/digital processing system as a whole. The analog/digital processing system 1 derives its inherent limitation from relation (1) above.

In particular, a rough formula can easily be derived for the upper band limit of the analog/digital processing system 1, which is substantially unrelated to the controller architecture. Since the branches emanating from +1 are linked angularly as follows:

$$2\pi f_b T < \frac{\pi}{M+1} \quad (2)$$

it is, $$f_b < \frac{1}{2T} \cdot \frac{1}{M+1} \text{ and } \frac{f_b}{f_N} < \frac{1}{M+1} \quad (3)$$

With ½T being the extreme band of the system 1 at a clock period T, it is apparent, as well as confirmed by equation (3) above, that the controller 5 can only "shape" a fraction of the useful band.

It should also be appreciated that the stability range of the controller 5 will decrease as the latency M increases in the phase-locking loop 6 because the effect of a correction can only be noticed after a time duration equal to the latency M. During this time, the system will be under the effect of the control.

As the latency M increases, for the same characteristics of the controller 5, it is obviously necessary to reduce the loop gain vco gain, since the corrective effect would dwell longer.

SUMMARY OF THE INVENTION

An embodiment of this invention provides a controller which has such structural and functional features that the effects of correction latency can be compensated without reducing the loop gain, thereby overcoming the limitations that are besetting prior art controllers.

The corrections made by the controller are stored up, and taken into account by the monitoring circuit to which the controller is connected.

Specifically, a valid compensation can be achieved by providing the monitoring circuit with a capability to store previous corrections. In this way, the monitoring circuit is no longer forced to wait for the effect of the corrections to propagate throughout the control loop of the analog/digital processing system incorporating the monitoring circuit and controller.

Thus, once the controller latency is known, its effects can be compensated by the monitoring circuit to provide a wider range of variation for the loop gain of the controller.

Specifically, the invention relates to a control signal compensating method, particularly intended for an analog/digital processing system provided with a control loop, including in turn a controller and a monitoring circuit.

The invention also relates to a compensation control system, being of the type which comprises a controller and a monitoring circuit connected in series with each other, between an input terminal and an output terminal of the compensation control system, said monitoring circuit having an input terminal connected to the input terminal of the compensation control system and an output terminal connected to an input terminal of said controller, the latter having an output terminal connected to the output terminal of the compensation control system.

Finally, the invention relates to an analog/digital processing system incorporating the above compensation control system.

The features and advantages of the compensation method, the compensation control system, and the analog/digital processing system according to the invention will be apparent from the following description of embodiments thereof, given by way of non-limitative examples with reference to the accompanying drawings.

DETAILED DESCRIPTION OF THE INVENTION

A method of compensating a correcting signal according to the invention provides for the correction values being applied to a control loop to be stored, such that the values can be used without waiting for the correction to propagate throughout the control loop.

In particular, in connection with an analog/digital processing system provided with a control loop which includes a controller and a monitoring circuit, the compensation method of this invention according to one embodiment comprises the following steps:

- storing the corrections made by the controller at the monitoring circuit to which the controller is connected;
- processing such corrections without waiting for the effect of the corrections to propagate throughout the control loop of the analog/digital processing system which incorporates the monitoring circuit and controller;
- generating a compensating signal for the latency effects of the controller, by the use of a negative feedback loop at the monitoring circuit.

Advantageously in this invention, the compensating signal $\Phi n$ at times $t=nT$, where T is the clock period, is given as:

$$\Phi n = In + \sum_{k=1}^{n} a_k \Phi_{n-k} \qquad (4)$$

where,

In is a signal detected at the input of the compensation circuit, and $a_k$ are compensation parameters.

The compensation method introduces N zeroes at the origin and N poles, being roots of the polynomial of coefficients $a_k$, as can be verified by effecting the z-transform of expression (4), to obtain:

$$\Phi(z) = I(z) + \sum_{k=1}^{n} a_k z^{-k} \Phi(z) \qquad (5)$$

Thus, the poles introduced by the latency can be controlled by "shifting" them to new positions selected by means of the compensation parameters $a_1, a_2, \ldots, a_N$.

Figure 6:
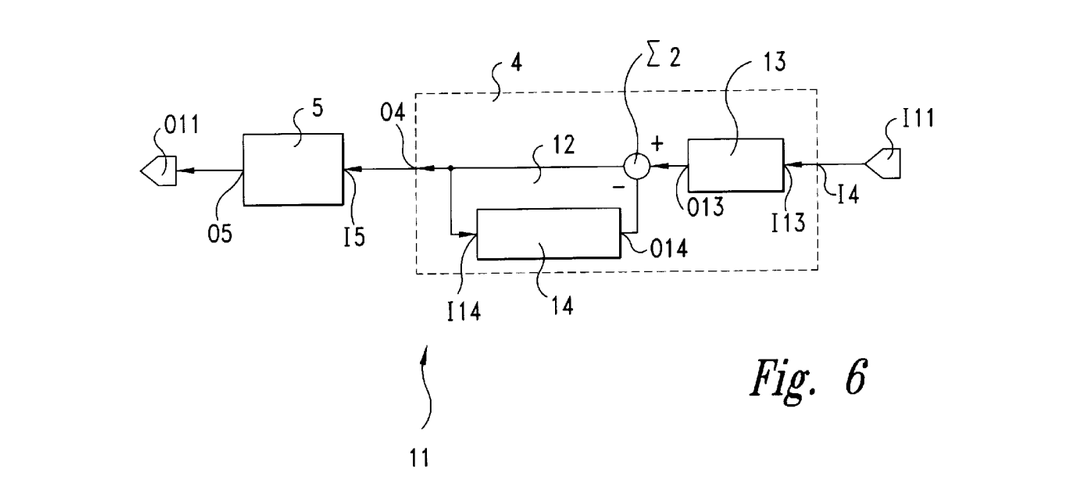
FIG. 6 shows schematically a compensation control system according to the invention.

Referring to FIG. 6, generally shown at 11 is a compensation control system, implementing the compensation method of one embodiment of this invention.

For clarity, elements functionally similar to corresponding elements of the analog/digital processing system 1 described in relation to the prior art are denoted by the same reference numerals.

The compensation control system 11 includes a controller 5 and a monitoring circuit 4 connected in series with each other between an input terminal I11 and an output terminal O11 of the compensation control system 11.

The monitoring circuit 4 has a local feedback loop 12 parallel to the normal correction flow of the compensation control system 11, so as to introduce no additional latency.

In particular, the monitoring circuit 4 comprises a linear detector 13 which has an input terminal I13 connected to the input terminal I4 of the monitoring circuit and an output terminal O13 connected to an adder terminal of an adder node Σ2, internal of the monitoring circuit 4. The monitoring circuit 4 further comprises a compensating circuit 14 feedback connected between the output terminal O4 of the monitoring circuit 4 and a subtract terminal of the adder node Σ2.

Figure 7:
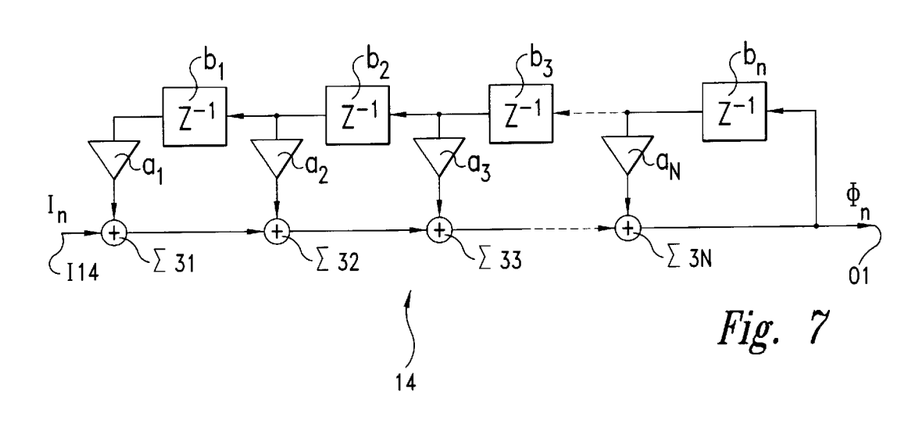
FIG. 7 is a detail view of the compensation control system shown in FIG. 6.

It should be noted that the linear detector 13 could be implemented conventionally by the skilled person in the art. FIG. 7 shows one embodiment of the compensating circuit 14.

In particular, the compensating circuit 14 comprises a plurality of adder nodes $\Sigma_{31}, \Sigma_{32}, \ldots, \Sigma_{3N}$ connected, in series with one another, between an input terminal I14 of the compensating circuit 14, which receives a detected signal In, and an output terminal O14 of the compensating circuit 14, which delivers a compensating signal $\Phi n$ at times $t=nT$, where T is the clock period.

The output terminal O14 of the compensating circuit 14 is further connected to the input terminal I14 thereof through a plurality of delay blocks $b_1, b_2, \ldots, b_N$ connected in series with one another, and connected via a plurality of decoupling blocks $a_1, a_2, \ldots, a_N$ to the plurality of adder nodes $\Sigma_{31}, \Sigma_{32}, \ldots, \Sigma_{3N}$.

The architecture of FIG. 7 enables a compensating signal $\Phi n$ to be obtained, as given by:

$$\Phi n = In + \sum_{k=1}^{n} a_k \Phi_{n-k}$$

the z-transform whereof is:

$$\Phi(z) = I(z) + \sum_{k=1}^{n} a_k z^{-k} \Phi(z)$$

i.e., the compensating signal sought, as given by expressions (4) and (5) specified above for the compensation method of this invention.

The compensating circuit 14, as shown in FIG. 7, therefore has N zeroes at the origin and N poles, being roots of the polynomial of coefficients $a_k$, and allows the poles introduced by the latency to be controlled by "shifting" them to new positions selected through the decoupling blocks $a_1$, $a_2$, ..., $a_N$ of the compensator circuit 14.

Advantageously in this invention, it thus becomes possible to act on the controller parameters from "outside", and use the monitoring circuit 4, which includes the compensating circuit 14, to optimize the control of the analog/digital processing system 1 to which such circuits are connected.

Figure 8:
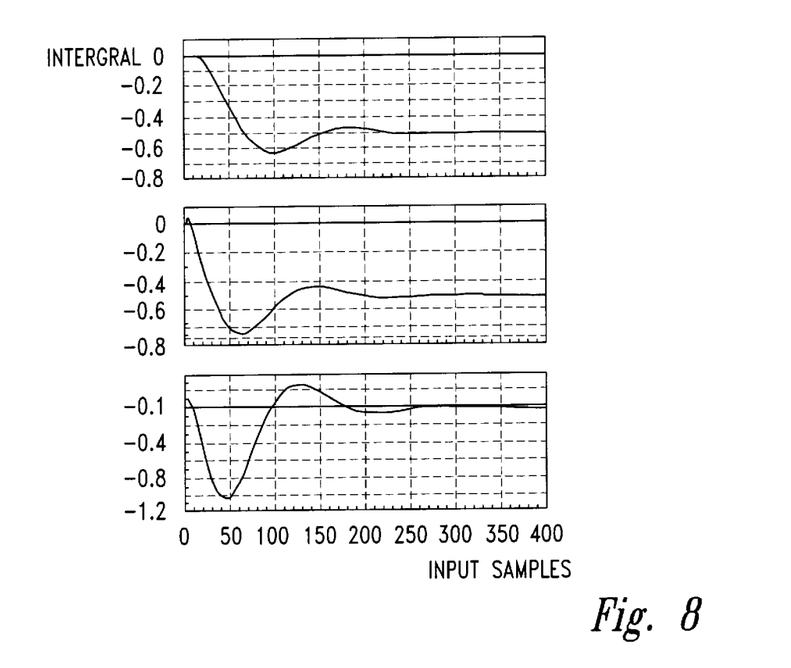
FIG. 8 illustrates the response of the prior controller of FIG. 2.
Figure 9:
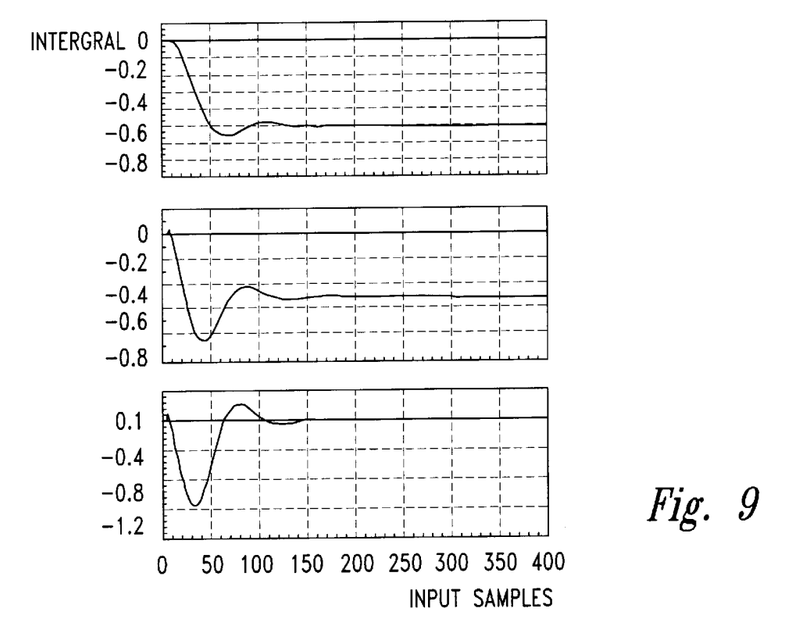
FIG. 9 illustrates the response of the compensation control system shown in FIG. 6.
Figure 10:
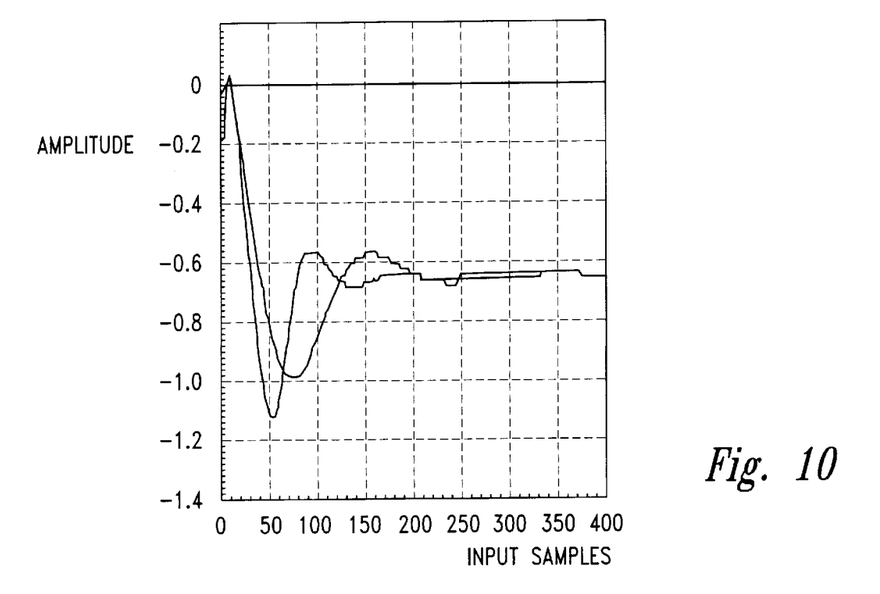
FIG. 10 illustrates by comparison the responses of the controllers shown in FIGS. 2 and 6.

The graphs of FIGS. 8, 9 and 10 illustrate a comparison between the responses of the conventional controller shown in FIG. 2 and the inventive compensation control system shown in FIG. 6, for the same loop gain vco gain, both with and without compensation.

In particular, plotted in FIG. 8 are the integral of the output signal (a), the output signal (b), and the phase error (c), respectively, at the output of the controller 5 shown in FIGS. 1 and 2. Plotted in FIG. 9 are the integral of the output signal (a), the output signal 9b), and the phase error (c), respectively, at the output of the linear detector 13, against the progressive number of input samples on the abscissa axis.

The graphs of FIGS. 8 and 9 concern a compensation control system 11, for M=8, A=12 (max) and B=6 (50%).

FIG. 10 shows the output signal (8(b)) for the prior art controller 5 of FIGS. 1 and 2 and the output signal (9(b)) for the linear detector 13 of FIG. 6. From their comparison in FIG. 10, the different lengths of the transient phase of the output signal from the linear detector 13 can be clearly appreciated.

In a simulation conducted by the Applicant using a "phase step +frequency step" type of signal:

$$I_n = \begin{cases} 0.1 - 0.5n & (n > 0) \\ 0 & (n < 0) \end{cases} \quad (6)$$

the compensating circuit 14 embodying this invention made the following picks:

N=3
$a_0$=−0.056
$a_2$=0.48
$a_3$=1

By applying these values to an analog/digital processing system 1A provided with a phase-locking loop or PLL controller as described in relation to the prior art, and to a similar analog/digital processing system 1B having a compensator circuit 14 at the output of the loop filter 7 according to the invention, the following convergence times are obtained:

TABLE I

| delta__dac | <4 lsb | <2 lsb |
| --- | --- | --- |
| system 1A (without compensator circuit 14) | 153 T | 176 T |
| system 1B (with compensator circuit 14) | 65 T | 98 T | where:
delta__dac is the difference between the instant value of the loop filter output and the steady-state value thereof; and
T is the clock period of the analog/digital processing system.

Table I relates a simple (and therefore non-optimized) example of a compensation control system according to the invention, as applied to an analog/digital processing system; it shows that the controller with a compensating circuit according to the invention affords a significant reduction in preamble length already while in non-optimum conditions.

In the digital version of the controller with a compensator according to the invention, the contents of N memories are added to the input signal using a single adder node.

While this compensating circuit does not add to the latency to the control loop of the analog/digital processing system, the adder node with N+1 inputs may require an additional clock cycle to complete a processing of interest.

In a preferred form of digital implementation of the compensation control system according to the invention, a two-input adder is used for the purpose which includes a carry-save type of stage introducing a delay:

$$\Delta = \tau_{adder} + (N+1-2) \cdot \tau_{carrys} \quad (7)$$

where:

$\tau_{adder}$ is the delay of the two-input adder, and $\tau_{carrys}$ is the delay of the adder stage of the carry-save type.

In this way, at the output of the linear detector 13 of the monitoring circuit 4 of the compensation control system 11, the resolution of the error signal will be kept low, and a smaller-size adder can be used.

Furthermore, as the N order of the compensator circuit 14 of the compensation control system according to the invention is increased, it becomes advisable to raise the latency M by unity. However, in view of that the use of a controller with a compensating circuit 14 would only justify itself in cases of high latency, the performance of the analog/digital processing system without compensation would suffer no significant diminution, and even this be counterbalanced by the enhanced effectiveness of the control with compensation.

From the foregoing it will be appreciated that, although specific embodiments of the invention have been described herein for purposes of illustration, various modifications may be made without deviating from the spirit and scope of the invention. Accordingly, the invention is not limited except as by the appended claims.

We claim:

1. A control signal compensation method particularly intended for an analog/digital processing system provided with a control loop, including in turn a controller and a monitoring circuit, the method comprising:

storing corrections made by the controller;

fast processing said corrections before transmitting the corrections throughout the control loop; and generating a compensating signal for latency effects of the controller, by using a negative feedback loop at a monitoring circuit level, the compensating signal given as:

$$\Phi n = In + \sum_{k=1}^{n} a_k \Phi_{n-k}$$

where:

In is a detected signal at an input of a compensating circuit of the control loop, and $a_k$ are compensation parameters.

2. The control signal compensation method according to claim 1 wherein said compensating signal introduces N zeroes in a frequency response origin and N poles, being roots of a polynomial of coefficients $a_k$ and, accordingly, controllable by the compensation parameters.

3. A compensation control system, comprising:

a controller and a monitoring circuit connected in series with each other, between an input terminal and an output terminal of the compensation control system, said monitoring circuit having an input terminal connected to the in put terminal of the compensation control system and an output terminal connected to an input terminal of said controller, the controller having an output terminal connected to the output terminal of the compensation control system, wherein said monitoring circuit includes a local feedback loop parallel to a normal control flow of the compensation control system, said local feedback loop comprising a compensating circuit having an input terminal connected to the output terminal of the monitoring circuit and having an output terminal connected to a subtract terminal of an adder node internal of said monitoring circuit;

wherein said compensating circuit comprises a plurality of delay blocks connected between the output terminal of the compensating circuit and the input terminal thereof, said plurality of delay blocks being themselves connected, via a plurality of decoupling blocks to the plurality of adder nodes, thereby producing the compensating signal at the output terminal of said compensating circuit, the compensating signal is given as:

$$\Phi n = In + \sum_{k=1}^{n} a_k \Phi_{n-k}$$

where:

In is the detected signal received at the input terminal of the compensating circuit, and $a_k$ are characteristic parameters of the plurality of decoupling blocks.

4. The compensation control system according to claim 3 wherein the monitoring circuit further comprises a linear detector having an input terminal connected to the input terminal of said monitoring circuit and having an output terminal connected to an adder terminal of the adder node internal of the monitoring circuit.

5. The compensation control system according to claim 3 wherein said compensating circuit further comprises a plurality of adder nodes connected, in series with one another, between the input terminal of the compensating circuit, arranged to receive a detected signal.

6. A compensation control system, comprising:

a controller and a monitoring circuit connected in series with each other, between an input terminal and an output terminal of the compensation control system, said monitoring circuit having an input terminal connected to the input terminal of the compensation control system and an output terminal connected to an input terminal of said controller, the controller having an output terminal connected to the output terminal of the compensation control system, wherein said monitoring circuit includes a local feedback loop parallel to a normal control flow of the compensation control system said local feedback loop comprising a compensating circuit having an input terminal connected to the output terminal of the monitoring circuit and having an output terminal connected to a subtract terminal of an adder node internal of said monitoring circuit;

wherein said compensating circuit is implemented in digital form and comprises a plurality of memories and a single two-input adder, the latter comprising a stage of the carry-save type which introduces a delay given as:

$$\Delta = \tau_{adder} + (N+1-2) \cdot \tau_{carrys}$$

where:

$\Sigma_{adder}$ is the delay of the two-input adder, and $\Sigma_{carrys}$ is the delay of the adder stage of the carry-save type.

7. A compensation control system, comprising:

a filter circuit having input, output, and control terminals;

a controller circuit having an input and an output coupled to the control terminal of the filter circuit; and a monitoring circuit having an input, an output, and a compensating circuit, the input being coupled to the output of the filter circuit and the output being coupled to the input of the controller circuit, the compensating circuit being in a feedback loop between the input and output of the monitoring circuit and the compensating circuit including means for producing a compensating signal given as:

$$\Phi n = In + \sum_{k=1}^{n} a_k \Phi_{n-k}$$

where:

In is a detected signal received at an input of the compensating circuit, and $a_k$ are characteristic parameters of a plurality of decoupling blocks included in the producing means.

8. The compensation control system of claim 7 wherein the monitoring circuit includes an adder node connected between the input and output of the monitoring circuit and the compensating circuit has an input connected to the output of the monitoring circuit and has an output connected to the adder node.

9. The compensation control system of claim 7 wherein the monitoring circuit further includes a linear detector and an adder node, the linear detector having an input connected to the input of said monitoring circuit and having an output terminal connected to an adder terminal of the adder node, the adder node having an output terminal connected to the output of the monitoring circuit and to an input of the compensating circuit and having a subtract terminal connected to an output of the compensating circuit.

10. The compensation control system of claim 7 wherein the compensating circuit includes a plurality of series-connected adder nodes.

11. The compensation control system of claim 10 wherein the compensating circuit further includes an input, an output, a plurality of decoupling blocks, and a plurality of delay blocks connected between the output and input of the compensating circuit, the plurality of decoupling blocks connecting the plurality of delay blocks to the plurality of adder nodes.

12. A compensation control system comprising:

a filter circuit having input, output, and control terminals;

a controller circuit having an input and an output coupled to the control terminal of the filter circuit; and a monitoring circuit having an input, an output, and a compensating circuit, the input being coupled to the output of the filter circuit and the output being coupled to the input of the controller circuit, the compensating circuit being in a feedback loop between the input and output of the monitoring circuit and the compensating circuit implemented in digital form and including a plurality of memories and a single two-input adder, the two-input adder including a carry-type adder stage which introduces a delay given as:

$$\Delta = \tau_{adder} + (N+1-2) \cdot \tau_{carrys}$$

where:

$\tau_{adder}$ is a delay of the two-input adder, and $\tau_{carrys}$ is a delay of the carry-save type adder stage.

13. The compensation control system of claim 7 wherein the filter circuit is an analog filter circuit, further comprising:

an input terminal coupled to the input of the analog filter circuit;

an output terminal;

a digital processing circuit connected in series with analog filter circuit between the input terminal and the output terminal, the digital processing circuit having an input connected to the output of the analog filter circuit and to the input of the monitoring circuit.

* * * * *

UNITED STATES PATENT AND TRADEMARK OFFICE
CERTIFICATE OF CORRECTION

PATENT NO : 6,014,613
DATED : Jan. 11, 2000
INVENTOR(S) : Angelo Dati and Ivan Bietti It is certified that error appears in the above-identified patent and that said Letters Patent is hereby corrected as shown below:

Column 9, Claim 3, line 11, "connected to the in put terminal" should read --connected to the input terminal--.

Column 9, Claim 6, line 67, "compensation control system said" should read --compensation control system, said--.

Column 10, Claim 6, line 15, "$\Sigma_{adder}$ is the delay" should read --$\tau_{adder}$ is the delay--.

Column 10, Claim 6, line 16, "$\Sigma_{carrys}$ is the delay" should read --$\tau_{carrys}$ is the delay--.

Column 10, Claim 12, line 66, "compensation control system comprising" should read --compensation control system, comprising--.

Abstract, line 5, "processing such as corrections" should read --processing such corrections--.

Signed and Sealed this

Twentieth Day of February, 2001

Attest:

NICHOLAS P. GODICI

*Attesting Officer*    *Acting Director of the United States Patent and Trademark Office*